United States Patent
Croy (10) Patent No.: US 9,258,386 B2
(45) Date of Patent: Feb. 9, 2016

(54) VOICE OVER INTERNET PROTOCOL (VOIP) MOBILITY DETECTION

(75) Inventor: Jon Croy, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1828 days.

(21) Appl. No.: 11/600,764

(22) Filed: Nov. 17, 2006

(65) Prior Publication Data
US 2007/0127452 A1 Jun. 7, 2007

Related U.S. Application Data

(60) Provisional application No. 60/737,799, filed on Nov. 18, 2005.

(51) Int. Cl.
*H04L 29/06* (2006.01)
*H04L 29/08* (2006.01)
*H04W 8/02* (2009.01)
(Continued)

(52) U.S. Cl.
CPC .......... *H04L 67/36* (2013.01); *H04L 29/06027* (2013.01); *H04L 41/12* (2013.01); *H04L 65/1083* (2013.01); *H04L 65/4007* (2013.01); *H04L 67/18* (2013.01); *H04W 8/02* (2013.01); *H04W 8/12* (2013.01); *H04L 29/12783* (2013.01); *H04L 41/0213* (2013.01);
(Continued)

(58) Field of Classification Search
CPC ...................... H04L 29/06027; H04L 65/1083; H04L 65/4007; H04L 67/18; H04W 8/02
USPC .................................................. 370/352, 331
See application file for complete search history.

(56) References Cited

U.S. PATENT DOCUMENTS 4,625,081 A 11/1986 Lotito
5,166,972 A 11/1992 Smith
(Continued)

FOREIGN PATENT DOCUMENTS

WO WO9921380 4/1999
WO WO01/45342 6/2001
(Continued)

OTHER PUBLICATIONS

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.
(Continued)

*Primary Examiner* — Khaled Kassim
(74) *Attorney, Agent, or Firm* — William H. Bollman (57) ABSTRACT

A mobility event for a VoIP user is detected, with an estimated confidence/certainty that the VoIP user in fact moved. In response, a user is prompted to cause an update to their registration and/or location information. Notification to the VoIP user of the likely need for a location update may be implemented in the communication protocol such that an icon on the VoIP phone displays the need to the VoIP user. The icon may include a measure of the confidence/certainty of the need for a location update, e.g., similar in visual image to the bars showing coverage on a wireless phone. Mobility of the VoIP user may be detected using, e.g., (1) The VoIP user's Internet protocol (IP) address; (2) a mapping of physical to logical location; and/or (3) mapping between physical location information and physical network resources such as switches, routers, ports, access points, etc.

11 Claims, 4 Drawing Sheets

(51) Int. Cl.
*H04W 8/12* (2009.01)
*H04L 29/12* (2006.01)
*H04L 12/24* (2006.01)
*H04W 4/02* (2009.01)
*H04W 80/04* (2009.01)

(52) U.S. Cl.
CPC ............... *H04L 61/35* (2013.01); *H04W 4/02* (2013.01); *H04W 80/04* (2013.01)

(56) References Cited

U.S. PATENT DOCUMENTS

| | | |
|---|---|---|
| 6,014,602 A | 1/2000 | Kitkil |
| 6,181,939 B1 | 1/2001 | Ahvenainen |
| 6,253,074 B1 | 6/2001 | Carlsson |
| 6,374,108 B1 | 4/2002 | Jakonsen et al. |
| 6,397,208 B1 | 5/2002 | Lee |
| 6,427,001 B1 | 7/2002 | Contractor |
| 6,529,500 B1 | 3/2003 | Pandharipande |
| 6,539,232 B2 | 3/2003 | Hendrey et al. |
| 6,694,351 B1 | 2/2004 | Shaffer |
| 6,744,858 B1 | 6/2004 | Ryan |
| 6,771,742 B2 | 8/2004 | McCalmont |
| 6,775,267 B1 | 8/2004 | Kung |
| 6,775,534 B2 | 8/2004 | Lindgren |
| 6,813,264 B2 | 11/2004 | Vassilovski |
| 6,836,476 B1 | 12/2004 | Dunn |
| 6,839,417 B2 | 1/2005 | Weisman |
| 6,847,618 B2 | 1/2005 | Laursen |
| 6,876,734 B1 | 4/2005 | Summers |
| 6,882,850 B2 | 4/2005 | McConnell et al. |
| 6,912,230 B1 | 6/2005 | Salkini |
| 6,934,547 B2 | 8/2005 | Suzuki |
| 6,940,826 B1 | 9/2005 | Simard |
| 6,940,950 B2 | 9/2005 | Dickinson et al. |
| 6,968,044 B2 | 11/2005 | Beason |
| 6,993,355 B1 | 1/2006 | Pershan |
| 7,106,717 B2 | 9/2006 | Rousseau |
| 7,136,466 B1 | 11/2006 | Gao |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,194,249 B2 | 3/2007 | Phillips |
| 7,245,900 B1 | 7/2007 | Lamb |
| 7,260,186 B2 | 8/2007 | Zhu |
| 7,260,384 B2 | 8/2007 | Bales et al. |
| 7,269,428 B1 | 9/2007 | Wallenius |
| 7,330,899 B2 | 2/2008 | Wong |
| 7,333,480 B1 | 2/2008 | Clarke |
| 7,369,530 B2 | 5/2008 | Keagy |
| 7,382,773 B2 | 6/2008 | Schoeneberger |
| 7,394,896 B2 | 7/2008 | Norton |
| 7,403,939 B1 | 7/2008 | Virdy |
| 7,412,049 B1 | 8/2008 | Koch |
| 7,436,785 B1 | 10/2008 | McMullen |
| 7,440,442 B2 | 10/2008 | Grabelsky |
| 7,453,990 B2 | 11/2008 | Welenson |
| 7,519,353 B2 * | 4/2009 | Stevens et al. ................. 455/407 |
| 7,573,982 B2 | 8/2009 | Breen |
| 7,602,886 B1 | 10/2009 | Beech |
| 7,617,287 B2 | 11/2009 | Vella |
| 7,623,447 B1 | 11/2009 | Faccin |
| 7,787,611 B1 | 8/2010 | Kotelly |
| 7,895,263 B1 | 2/2011 | Kirchmeier |
| 8,005,683 B2 | 8/2011 | Tessel |
| 8,027,658 B2 | 9/2011 | Suryanarayana |
| 8,060,389 B2 | 11/2011 | Johnson |
| 8,090,341 B2 | 1/2012 | Mitchell |
| 2001/0021646 A1 | 9/2001 | Antonucci |
| 2001/0036183 A1 * | 11/2001 | Melick et al. ................. 370/389 |
| 2002/0086676 A1 | 7/2002 | Hendry |
| 2002/0118650 A1 | 8/2002 | Jagadeesan |
| 2002/0126656 A1 | 9/2002 | Park |
| 2002/0160766 A1 | 10/2002 | Portman |
| 2002/0191595 A1 | 12/2002 | Mar |
| 2003/0012148 A1 | 1/2003 | Peters |
| 2003/0026245 A1 | 2/2003 | Ejzak |
| 2003/0044654 A1 | 3/2003 | Holt |
| 2003/0069002 A1 | 4/2003 | Hunter |
| 2003/0108176 A1 | 6/2003 | Kung |
| 2003/0109245 A1 | 6/2003 | McCalmont |
| 2003/0186709 A1 | 10/2003 | Rhodes |
| 2004/0032485 A1 | 2/2004 | Stephens |
| 2004/0043775 A1 | 3/2004 | Kennedy |
| 2004/0047461 A1 | 3/2004 | Weisman et al. |
| 2004/0076277 A1 | 4/2004 | Kuusinen |
| 2004/0150518 A1 | 8/2004 | Phillips |
| 2004/0152493 A1 | 8/2004 | Phillips |
| 2004/0181689 A1 | 9/2004 | Kiyoto |
| 2004/0184584 A1 | 9/2004 | McCalmont |
| 2004/0190497 A1 | 9/2004 | Knox |
| 2004/0192271 A1 | 9/2004 | Eisner |
| 2004/0198332 A1 | 10/2004 | Lundsgaard |
| 2004/0203568 A1 | 10/2004 | Kirtland |
| 2004/0247090 A1 | 12/2004 | Nurmela |
| 2004/0258021 A1 * | 12/2004 | Kashimoto et al. ........... 370/331 |
| 2005/0003797 A1 | 1/2005 | Baldwin |
| 2005/0015456 A1 | 1/2005 | Martinson |
| 2005/0030977 A1 | 2/2005 | Casey et al. |
| 2005/0031095 A1 | 2/2005 | Pietrowics |
| 2005/0053209 A1 | 3/2005 | D'Evelyn |
| 2005/0063519 A1 | 3/2005 | James |
| 2005/0074107 A1 | 4/2005 | Renner |
| 2005/0078612 A1 | 4/2005 | Lang |
| 2005/0083911 A1 | 4/2005 | Grabelsky |
| 2005/0089010 A1 | 4/2005 | Rue et al. |
| 2005/0090236 A1 | 4/2005 | Schwinke |
| 2005/0101335 A1 | 5/2005 | Kelly |
| 2005/0107673 A1 | 5/2005 | Ball |
| 2005/0125376 A1 | 6/2005 | Curtis |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0201529 A1 | 9/2005 | Nelson |
| 2005/0213716 A1 | 9/2005 | Zhu |
| 2005/0222908 A1 | 10/2005 | Altberg |
| 2005/0232252 A1 | 10/2005 | Hoover |
| 2005/0238156 A1 | 10/2005 | Turner |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0068753 A1 | 3/2006 | Karpen |
| 2006/0072729 A1 | 4/2006 | Lee |
| 2006/0077911 A1 | 4/2006 | Shaffer |
| 2006/0078094 A1 | 4/2006 | Breen |
| 2006/0088152 A1 | 4/2006 | Green |
| 2006/0120517 A1 | 6/2006 | Moon |
| 2006/0135177 A1 | 6/2006 | Winterbottom |
| 2006/0188083 A1 | 8/2006 | Breen |
| 2006/0193447 A1 | 8/2006 | Schwartz |
| 2006/0233338 A1 | 10/2006 | Punaganti Venkata |
| 2006/0239205 A1 | 10/2006 | Warren |
| 2006/0250987 A1 | 11/2006 | White |
| 2006/0259365 A1 | 11/2006 | Agarwal |
| 2006/0281437 A1 | 12/2006 | Cook |
| 2006/0293024 A1 | 12/2006 | Benco |
| 2007/0003024 A1 | 1/2007 | Olivier |
| 2007/0014282 A1 | 1/2007 | Mitchell |
| 2007/0019614 A1 | 1/2007 | Hoffmann |
| 2007/0022011 A1 | 1/2007 | Altberg |
| 2007/0027997 A1 | 2/2007 | Polk |
| 2007/0036139 A1 | 2/2007 | Patel |
| 2007/0041513 A1 | 2/2007 | Gende |
| 2007/0067823 A1 * | 3/2007 | Shim et al. ........................ 726/2 |
| 2007/0081635 A1 | 4/2007 | Croak |

(56) References Cited

U.S. PATENT DOCUMENTS

| | | |
|---|---|---|
| 2007/0115941 A1 | 5/2007 | Patel |
| 2007/0121601 A1 | 5/2007 | Kikinis |
| 2007/0160036 A1 | 7/2007 | Smith |
| 2007/0162228 A1 | 7/2007 | Mitchell |
| 2007/0242660 A1 | 10/2007 | Xu |
| 2007/0263610 A1 | 11/2007 | Mitchell |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0186164 A1 | 8/2008 | Emigh |
| 2008/0214202 A1 | 9/2008 | Toomey |
| 2008/0249967 A1 | 10/2008 | Flinn |
| 2010/0119049 A1 | 5/2010 | Clark |
| 2011/0263219 A1* | 10/2011 | Hasenfang et al. ........ 455/404.2 |
| 2011/0273568 A1 | 11/2011 | Lagassey |
| 2012/0001750 A1 | 1/2012 | Monroe |
| 2012/0189107 A1 | 7/2012 | Dickinson |
| 2012/0243466 A1* | 9/2012 | Hagens et al. ................ 370/328 |

FOREIGN PATENT DOCUMENTS

| | | |
|---|---|---|
| WO | WO2004/025941 | 3/2004 |
| WO | WO2007/011861 | 7/2006 |

OTHER PUBLICATIONS

Extended European Search Report from EPO in European Appl. No. 06827172.5 dated Dec. 29, 2009.
International Search Report in PCT/US2008/01441dated May 16, 2008.
Yilin Ahao, Efficient and reliable date transmission for cellular and GPS based mayday systems, Nov. 1997, IEEE, IEEE Conference on Intelligent Transportation System, 1997. ITSC 97, 555-559.
International Search Report in PCT/US2006/44567, Sep. 26, 2007.
International Search Report in PCT/US2006/44567dated Aug. 5, 2008.
Supplementary European Search Report in European Patent Appl. No. 08713387.2-2414/2116029 dated Apr. 18, 2012.
International Search Report received in PCT/US2011/001990 dated Apr. 24, 2012.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

* cited by examiner

VOICE OVER INTERNET PROTOCOL (VOIP) MOBILITY DETECTION

The present invention claims priority from U.S. Provisional Application No. 60/737,799, filed Nov. 18, 2005, entitled "Voice Over Internet Protocol (VoIP) Mobility Detection" to Jon Croy, the entirety of which is expressly incorporated herein by reference.

BACKGROUND OF THE INVENTION

1. Field of the Invention

This invention relates generally to voice over Internet Protocol (VoIP) technologies. More particularly, it relates to location based services for VoIP protocols and architectures.

2. Background of the Related Art 911 is a phone number widely recognized in North America as an emergency phone number that is used by emergency dispatch personnel, among other things, to determine a location of a caller. Enhanced 911 (E911) is defined by the transmission of callback number and location information. E911 may be implemented for landline and/or wireless devices.

A Public Safety Answering Point (PSAP) is a dispatch office that receives 9-1-1 calls from the public. A PSAP may be a local, fire or police department, an ambulance service or a regional office covering all services. A 9-1-1 ("911") service becomes E-9-1-1 ("E911") when automatic number identification and automatic location information from a communications device (e.g. wireless phone, VoIP Phone, etc.) is provided to the 911 operator.

Voice-Over-Internet Protocol (VoIP) is a technology that emulates a phone call, but instead of using a circuit based system such as the telephone network, utilizes packetized data transmission techniques most notably implemented in the Internet. 911 calls made using VoIP technology must reach the correct PSAP, but there currently is no uniform interface to the various PSAPs for call delivery because the technology for connecting calls varies. For instance, not all PSAPs are Internet Protocol (IP) capable. Some PSAPs are accessed via ordinary public switched telephone network (PSTN) telephone lines. Some PSAPs are accessed through selective routing such as direct trunks. Still other PSAPs are accessed using IP connections. There is no uniformity among the thousands of different PSAPs.

Moreover, some Public Safety Access Points (PSAPs) are not enhanced, and thus do not receive the callback or location information at all from any phone, landline or wireless.

The use of VoIP technology is growing quickly. As people adopt voice-over-IP (VoIP) technology for routine communications, the inventors herein recognize that there is a growing need to access E911 services including provision of location information from a VoIP device.

The existing E911 infrastructure is built upon copper wire line voice technology and is not fully compatible with VoIP. Given VoIP technology, there are at least three VoIP scenarios:

1. A VoIP UA that is physically connected to a static data cable at a "home" address. For instance, an Analog Telephone Adapter (ATA) that is connected to the "home" data cable and uses traditional telephone devices.
2. A VoIP UA that is physically connected to a data cable at a location different than its "home" address. For instance, a laptop computer device utilized away from home as a VoIP software telephone would be a VoIP 'visitor' device as described by this scenario.
3. A VoIP UA that is wireless, physically disconnected from any data cable. In this situation, the VoIP UA connects to the VoIP service provider via either a wide-are wireless technology (e.g., cellular, PCS, WiMAX) or via a local-area wireless technology (e.g., Wireless Fidelity (WiFi), UWB, etc.) using a laptop computer or handheld device.

VoIP phone calls are routed to a VoIP voice gateway, from which they are passed on to their destination. A VoIP voice gateway or soft switch is a programmable network switch that can process the signaling for all types of packet protocols. Also known as a 'media gateway controller,' or 'call agent,' or 'call server,' such devices are used by carriers that support converged communications services by integrating SS7 telephone signaling with packet networks. Softswitches can support, e.g., IP, DSL, ATM and frame relay.

The challenges evident with respect to determining the location of a calling VoIP telephone is perhaps most evident with respect to its use to make an emergency call (e.g., a 911 call). Nevertheless, VoIP telephone technology is quickly replacing conventional switched telephone technology. However, because VoIP is Internet Protocol (IP) based, call related information such as CallerID type services may not be available or accurate.

Some Public Safety Access Points (PSAPs) are not enhanced, and thus do not receive the callback or location information at all from any phone; landline, cellular or VoIP.

Moreover, there is complexity in public access to Public Safety Answering Points due to lack of a Session Initiation Protocol (SIP) Uniform Resource Identifier (URI) for all PSAPs. (SIP is the IP-based protocol defined in IETF RFCs 3261 and 2543.) SIP is one of two dominant protocols used by the VoIP industry. URI is the addressing technology for identifying resources on the Internet or a private intranet. URIs were originally defined as two types: Uniform Resource Locators (URLs) which are addresses with network location, and Uniform Resource Names (URNs) which are persistent names that are address independent. Today, a URI is defined by its purpose rather than the URL vs. URN classification.) Some PSAPs are accessed only by conventional telephone line, others only by direct telephone trunk lines. Not all PSAPs are accessible via the Internet.

Figure 3:
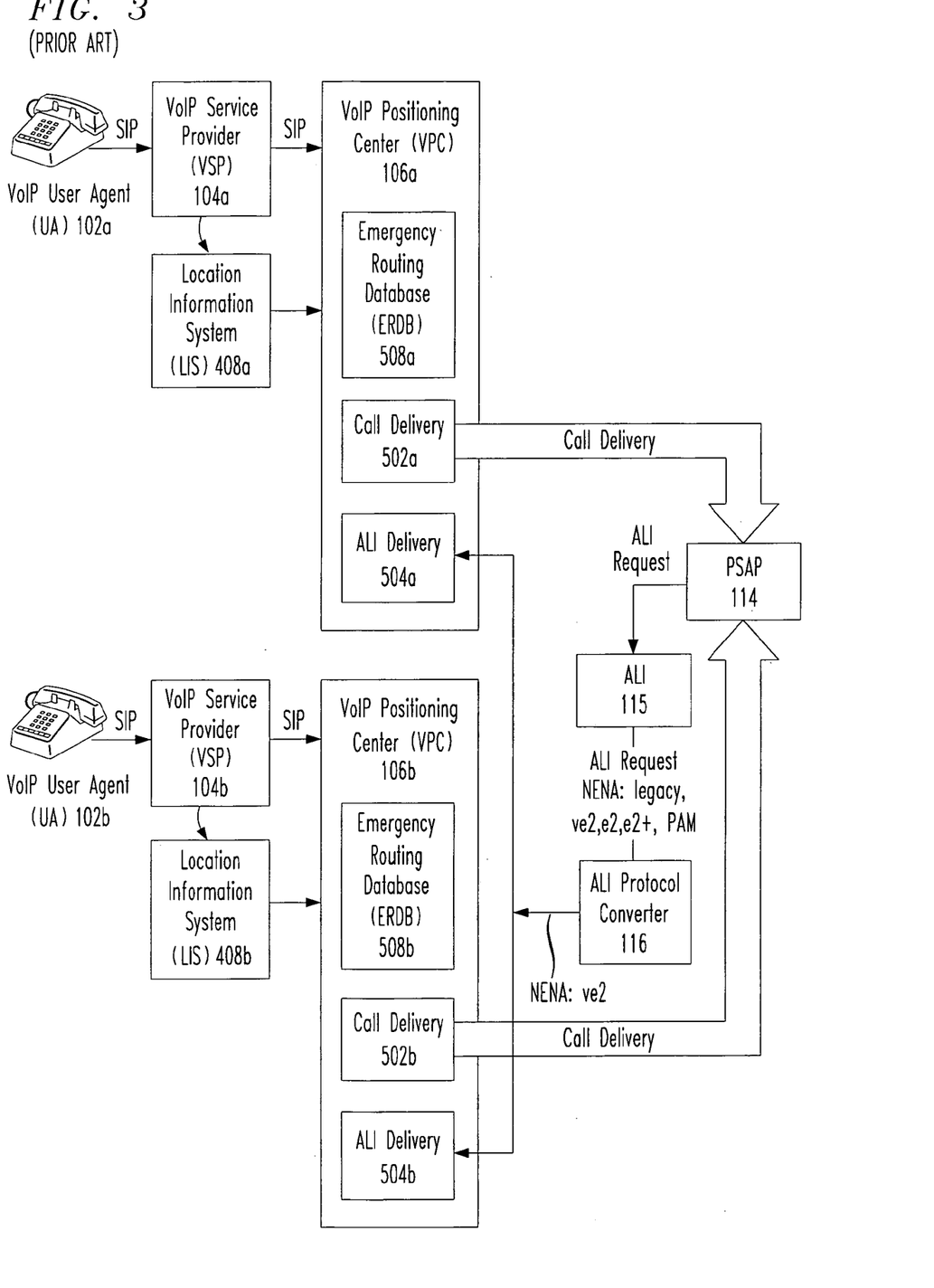
FIG. 3 shows basic conventional VoIP elements required to interconnect a VoIP emergency E911 caller to a relevant public safety access point (PSAP).

FIG. 3 shows basic conventional VoIP elements required to interconnect a VoIP emergency E911 caller to a relevant public safety access point (PSAP).

In particular, as shown in FIG. 3, VoIP telephone devices 102a, 102b, 102c (collectively referred to as 102) are connected to respective VoIP Service Provider (VSP) soft switches 104a, 104b, 104c (collectively referred to as 104) using an Internet Protocol (IP) connection, most commonly over the Internet. The VoIP service provider's soft switch 104 in turn communicates with a respective VoIP Positioning Center (VPC) 106a, 106b, 106c (collectively referred to as 106) using an appropriate IP connection. Each VSP requires use of their own VPC, as depicted in FIG. 3.

Figure 4:
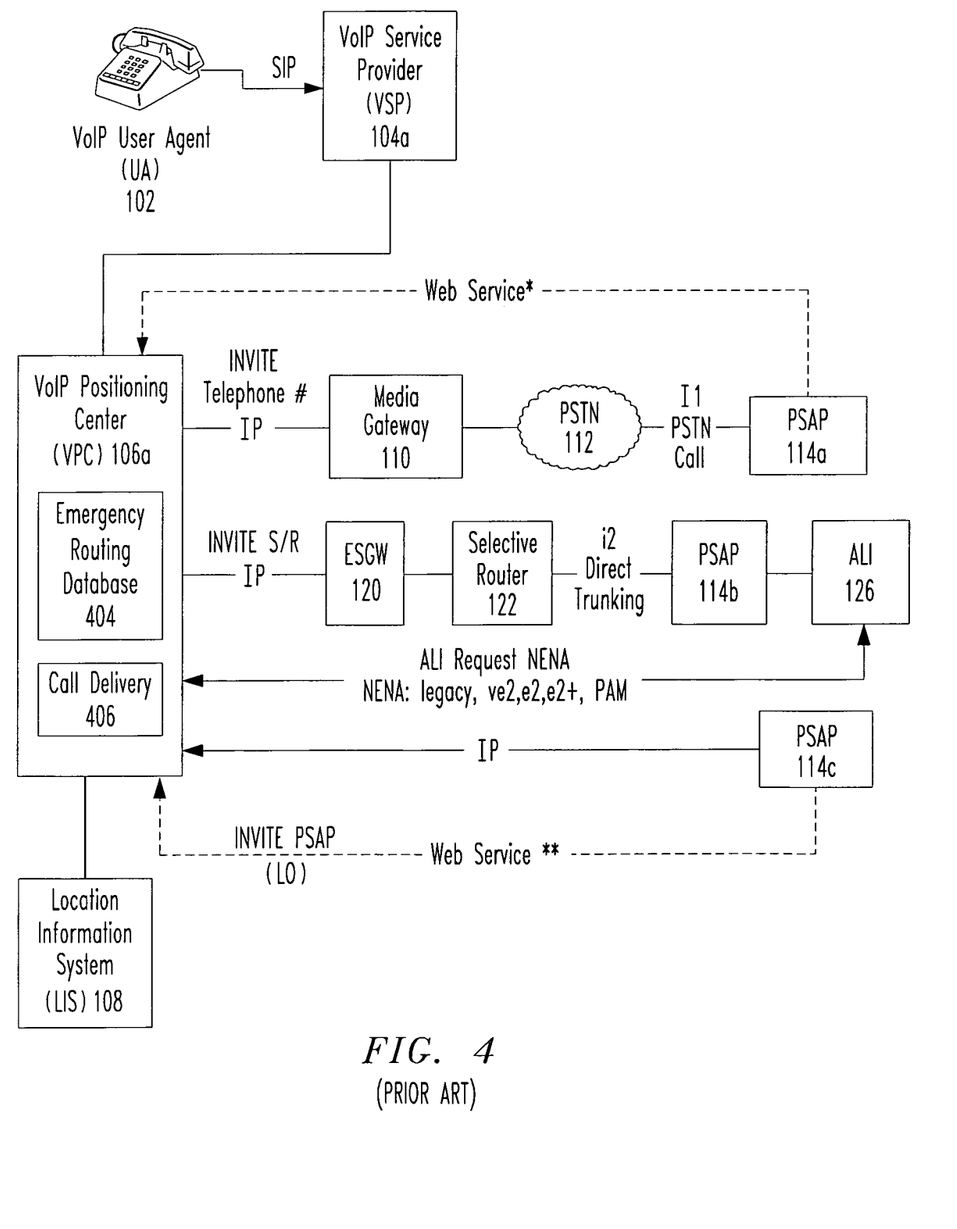
FIG. 4 shows in more detail conventional VoIP elements required by a VPC to interconnect a VoIP emergency E911 caller to a relevant public safety access point (PSAP).

FIG. 4 shows in more detail conventional VoIP elements required by a VPC to interconnect a VoIP emergency E911 caller to a relevant public safety access point (PSAP).

In particular, as shown in FIG. 4, each VPC 106 comprises its own respective route determination module 404, call delivery module 406, and provisioning list 408.

A respective location information server (LIS) 108 services each of the VPCs 106. The LIS 108 is responsible for storing and providing access to the subscriber location information needed for E9-1-1 call processing (as defined by the NENA VoIP Location Working Group).

A conventional VoIP Positioning Center (VPC) 106 is a system that attempts to determine the appropriate or correct PSAP 114 that a VoIP emergency E911 call should be routed to based on the VoIP subscriber's position. The conventional VPC 106 also returns associated routing instructions to the VoIP network. The conventional VPC 106 additionally provides the caller's location and the callback number to the relevant PSAP through the automatic location identifier (ALI) (The ALI is a database that accepts a PSAP query, and using that relates a specific telephone number to a street address. In the case of an Emergency Services Query Key (ESQK), the ALI database steers the query to the appropriate VPC and steers the response back to the PSAP. An ALI is typically owned by a LEC or a PSAP.)

Further as shown in FIG. 4, each VSP route the emergency 9-1-1 call, without location object added, to their VPC 106. The VPC must determine the correct PSAP 114 (collectively represented by PSAP 114*a*, 114*b* and 114*c*) and route to it using the appropriate technology.

In a first scenario, the VPC 106 passes the 9-1-1 call to the PSAP 114*a* using an INVITE telephone number message, via a media gateway 110 that translates between the IP protocol of the INVITE message and a telephone line interface, and interfaces with the public switched telephone network (PSTN) 112.

In a second scenario, the VPC 106 passes the 9-1-1 call to the PSAP 114*b* using an INVITE S/R message, via an ESGW 120 and selective router 122. In this scenario, the selective router 122 is connected to the relevant PSAP 114*b* via direct trunks.

In a third scenario, the VPC 106 passes the 9-1-1 call to the PSAP 114*c* using an INVITE PSAP message, via IP, to the PSAP 114*c*.

In the second and third scenario, the ALI 126 must be interconnected with each VPC 106 (*a,b,c*). Furthermore, each VPC is burdened with supporting all the various ALI protocols: ve2, e2, PAM, legacy NENA, etc.

The location of a VoIP user is critical information for a 911 call, and is also valuable for other VoIP applications. Location of a given VoIP device is typically provisioned to be at a given geographic location, or queried from a home location register (HLR) in a mobile system. But users often do not update their location when they move, and there is currently no method to determine whether the user's location is outdated.

Conventional solutions rely on VoIP users themselves to manually instigate an update of their location information. When manually causing an update, the location of the user may be determined using conventional techniques, e.g., via global positioning system (GPS), triangulation, physical wire mapping and/or other techniques. However, these conventional mechanisms are too inflexible because they rely on the VoIP user to proactively trigger an update of their location information.

There is a need for better techniques and apparatus for maintaining an accurate updated location of a VoIP user.

SUMMARY OF THE INVENTION

A method of detecting mobility of a voice over Internet protocol (VoIP) device in accordance with the principles of the present invention comprises monitoring for a change in at least one of (1) an IP address of the VoIP device as an indicator of likely movement of the VoIP device, (2) a logical location mapping of the VoIP device as an indicator of likely movement of the VoIP device, and (3) a physical network resources mapping of the VoIP device as an indicator of likely movement of the VoIP device. An update of network stored location information regarding the VoIP device is initiated upon detection of the change in the IP address of the VoIP device indicating a change of the VoIP device.

In accordance with another aspect of the invention, a mobility detection service comprises a database associating at least one of a plurality of VoIP devices to (1) a last known Internet protocol (IP) address for each respective VoIP device, (2) to a last known logical location mapping, and (3) to a last known physical network resources mapping. Comparison logic monitors the plurality of VoIP devices for any change in the last known IP address. If a change in the last known IP address is detected, a likelihood of movement of a given VoIP device is indicated.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides detection of a need for updating of location information of a given VoIP user. Upon detection of mobility of a VoIP user, a triggering event instigates a location update of a VoIP user, allowing the user to automatically or manually update location at that time. Thus, mobility of a VoIP user, or the likelihood that the VoIP user has moved, is detected, and a mobility detection trigger is generated to cause the VoIP user to manually or automatically update their location.

The mobility detection includes detection of an occasional move by a static VoIP user such as moving to a new residential address. The mobility detection also detects frequent moves by a mobile VoIP user, e.g., in an automobile driving down a highway.

Upon detection of the likely movement of the VoIP user, action to cause an attempted update to the location of the VoIP user is triggered by the generation of mobility detection trigger.

The inventive solution automatically detects when a mobility event has occurred, estimates the confidence/certainty that the event occurred. Events can be classified over a continuum based on the observed mobility behavior (e.g., did the IP address change occur within a few seconds or did it take several hours; did the IP address change drastically indicating that a subnet change may have occurred), and based on the mobility event an action may be taken to cause an update to the registration and/or location information of that VoIP user, e.g., prompting the VoIP user to manually update their location at that time or prompting the voice service provider to temporarily disable service.

Notification to the VoIP user of the likely need for a location update may be implemented in the communication protocol. This could trigger an event on the user phone such that an icon on the VoIP phone displays the need to the VoIP user. The icon may include a measure of the confidence/certainty of the need for a location update, e.g., similar in visual image to the bars showing coverage on a wireless phone. Other events could be triggered such as a change in dial tone. This invention simply provides the signaling necessary to enable this behavior. Such behavior will have to be programmed in by the phone manufacturer.

Mobility of the VoIP user may be detected using, e.g., (1) The VoIP user's Internet protocol (IP) address; (2) a mapping of physical to logical location; and/or (3) mapping between physical location information and physical network resources such as switches, routers, ports, access points, etc. Indication of likely movement of the VoIP user by only one of techniques (1), (2) or (3) may be presented as determining a lower confidence/certainty that the VoIP user has in fact moved. Indication by two of the techniques (1), (2) and/or (3) may be presented as determining a mid-level confidence/certainty measurement. Similarly, an indication by all three of the techniques (1), (2) and (3) may be presented as determining a highest confidence/certainty that the VoIP user has in fact moved. If additional techniques are added, or if a technique (1), (2) or (3) is not implemented, the confidence/certainty measurement may be appropriately adjusted for presentation to the VoIP user.

A threshold condition may be set before mobility detection is confirmed. In disclosed embodiments, mobility is detected if any of techniques (1), (2) or (3) indicate a likely movement of a given VoIP user.

Figure 1:
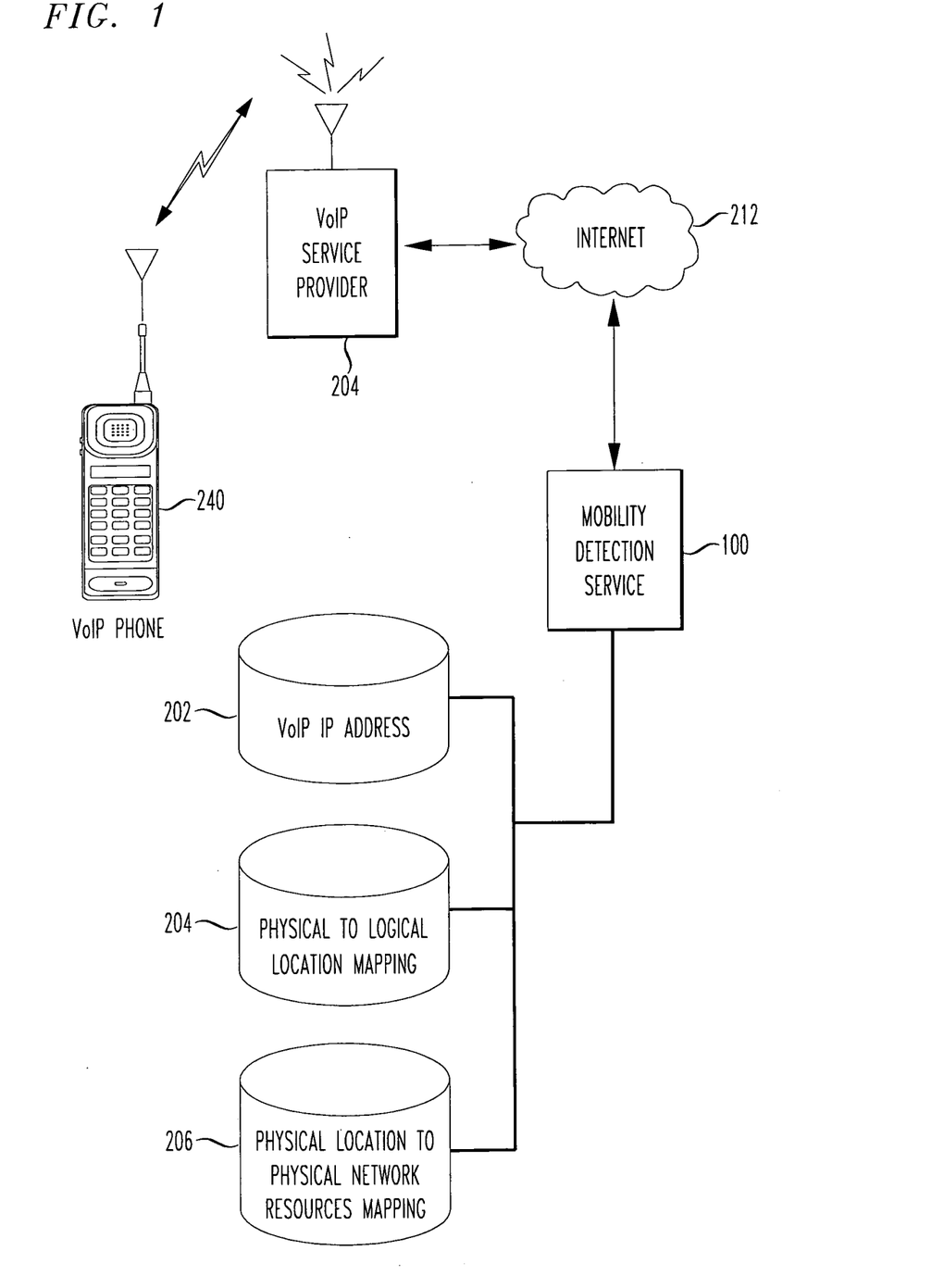
FIG. 1 shows a mobility detection service monitoring a likely movement of a VoIP phone, in accordance with the principles of the present invention.

FIG. 1 shows a mobility detection service monitoring a likely movement of a VoIP phone, in accordance with the principles of the present invention.

In particular, as shown in FIG. 1, a mobility detection service 100 monitors a likely movement of subscriber VoIP phones 240 based on any or all of a number of monitor techniques.

A first monitor technique relates to a comparison of a current IP address to a past IP address for a given VoIP phone 240 stored in an appropriate VoIP IP address database 202. If a current IP address of a VoIP phone has changed, the new IP address is stored into the VoIP IP address database 202 associated with that VoIP phone 240, and an indication is provided to the mobility detection service 100 that the VoIP phone 240 is likely now mobile, and that location for that VoIP phone 240 should be updated. The location can be updated either automatically via Location Object, or manually by prompt to the user of the VoIP phone 240.

A second monitor technique relates to a change in a logical location of the VoIP phone 240. To this end, the physical location of subscriber VoIP phones 240 are mapped to their respective logical locations, and stored in an appropriate physical to logical location mapping database 204.

A third monitor technique relates to a change in a physical network resources link used to communicate with a given VoIP phone 240, e.g., through the VoIP service provider 204 and routers within the Internet 212. To this end, the physical location of subscriber VoIP phones 240 are mapped to their respective physical network resources used to communicate with that VoIP phone 240, and stored in an appropriate physical location to physical network resources mapping database 206.

After detection of likely mobility using one monitor technique, other available mobility techniques may be activated for the relevant VoIP phone at that time. Alternatively, the monitor techniques can be used individually, and as more than one monitor technique detects likely movement of the mobile VoIP phone 240, the VoIP phone can be notified of an increased confidence in the likelihood that the mobile VoIP phone 240 has in fact moved and should have its location updated.

Figure 2:
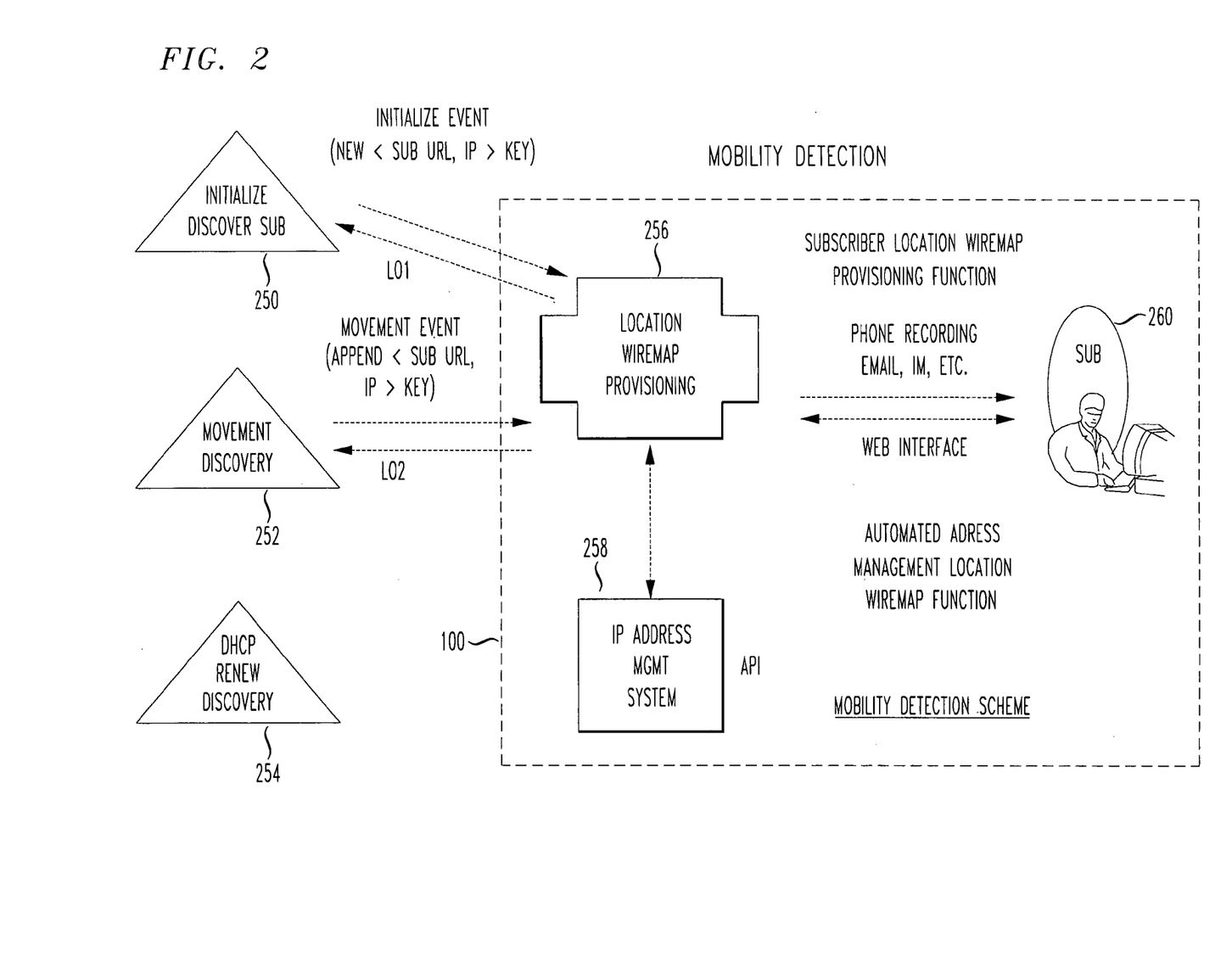
FIG. 2 depicts mobility detection using location wiremap provisioning and/or IP address management system, in accordance with the principles of the present invention.

FIG. 2 depicts mobility detection using location wiremap provisioning and/or an IP address management system, in accordance with the principles of the present invention.

In particular, as shown in FIG. 2, the likelihood of mobility of a given VoIP phone can be detected using any or all of at least three different functions: VoIP registration; physical and logical layer topology; and/or location wiremap provisioning.

VoIP Registration
(Associating the VoIP User's Registration with IP Address and Other Attributes)

Every VoIP device must register with a VoIP Registrar entity as to its relationship of a user, device and IP address relationship. As a VoIP device registers to a Registrar, it registers it address-of-record to a Universal Resource Indicator (URI). The URI has a mapping to a Contact address which defines the IP address of the device in which the address-of-record URI is binded to.

Physical and Logical Layer Function (discovery of layer 1, layer 2 and layer 3 topology relationship within a given environment)

Mapping between logical and physical locations preferably occurs through a basic protocol such as the Simple Network Management Protocol (SNMP). Using SNMP and its related Management Information Base (MIBs), a series of scans can be done with the outcome of a physical and logical map that accurately describes the relationship of links, network elements, Virtual Local Area Networks VLANs and IP subnets/host routes.

For Residential VoIP, at the time of a VoIP User's SIP Registration, the user may use a tool such as a web interface to associate their URI/IP information (logical location) with a URI/address (physical location) and stored in a Physical/Logical Layer Database.

Location Wiremap Provisioning (mapping between Physical location information to physical network resources such as switches, routers, ports, access points, etc.)

Each network resource preferably has an inventory as to their physical location and where their port terminates (e.g., a specific Switch S1 has Port 1 that terminates via a physical cable to Cubicle 14 in the East Wing of Building 123 1st St in Bellevue, Wash., 98004, USA). This information is preferably entered manually by a human via a web browser into a Location Wiremap Provisioning Function database somewhere on the network, or it can be entered into the configuration of the network element in focus, which in turn updates the Location Wiremap database.

This information is sufficient to enable a Mobility Detection service to determine when a static or mobile user has moved to another location (including a level of confidence that a move has actually occurred) and to take action accordingly, such as to prompt the user to update their registration.

The prompt may be, e.g., a dial-tone sound, instant message, or other communication mechanism to the VoIP user.

The information from the three sources listed above may also serve as the input data for a Location Object Function, which would have the ability to deliver or insert a Location Object within a VoIP call request.

The mobility detection service preferably monitors pre-registered VoIP users at appropriate intervals, determining if movement is detected using each of the relevant techniques, e.g., (1) VoIP IP address; (2) Mapping of physical to logical location; and (3) Mapping of physical location and physical network resources.

VoIP mobility detection in accordance with the principles of the present invention can be used to generate locally targeted commercial information/suggestions for users based on their location (e.g., through a configurable setting that would reset default values for local information websites such as traffic, news, weather, events when a mobility event occurs). Moreover, information from the three sources listed above also serves as the input data for a Location Object Function, which may have the ability to deliver or insert a Location Object within a VoIP call request.

Markets for VoIP mobility detection capability include VoIP users to keep their location information current. Moreover, VoIP service providers may use VoIP mobility detection capability in accordance with the present invention as a service differentiator/benefit for their customers.

While the invention has been described with reference to the exemplary embodiments thereof, those skilled in the art will be able to make various, modifications to the described embodiments of the invention without departing from the true spirit and scope of the invention.

What is claimed is:

1. A method of detecting mobility of a voice over Internet protocol (VoIP) device, comprising:
    monitoring a pre-registered VoIP user, at a given interval, for a mobility triggering event instigating a location update of said pre-registered VoIP device;
    determining a confidence that said mobility triggering event indicates that said pre-registered VoIP device has likely moved by detecting how many of the following (1), (2) and/or (3) have changed:
        (1) an IP address associated with said pre-registered VoIP device to indicate a likely movement of said pre-registered VoIP device,
        (2) a logical location mapping of said pre-registered VoIP device to indicate a likely movement of said pre-registered VoIP device, and
        (3) a physical network resources mapping of said pre-registered VoIP device to indicate a likely movement of said pre-registered VoIP device; and
    in response to said mobility triggering event of said pre-registered VoIP device, initiating an update of network stored geographic lat/lon location information regarding said pre-registered VoIP device;
    wherein said confidence that said mobility triggering event indicates that said VoIP device has indeed moved is highest when said (1), said (2), and said (3) have changed, and lowest when only one of said (1), said (2), and said (3) have changed.

2. The method of detecting mobility of a voice over Internet protocol (VoIP) device according to claim 1, wherein said update of said network stored location comprises:
    prompting a user of said VoIP device to update said stored geographic lat/lon location information associated with said pre-registered VoIP device.

3. The method of detecting mobility of a voice over Internet protocol (VoIP) device according to claim 1, wherein:
    said pre-registered VoIP device is a phone.

4. The method of detecting mobility of a voice over Internet protocol (VoIP) device according to claim 1, wherein said monitoring comprises:
    comparing a last IP address of said pre-registered VoIP device stored in an appropriate VoIP IP address database, to a current IP address of said pre-registered VoIP device.

5. The method of detecting mobility of a voice over Internet protocol (VoIP) device according to claim 1, further comprising:
    detecting a time between a change in said (1), said (2), or said (3).

6. A mobility detection server, comprising:
    a database associating a plurality of pre-registered VoIP devices to a last known Internet protocol (IP) address for each respective pre-registered VoIP device, a last known logical location mapping, and a last known physical network resources mapping;
    a monitor to monitor a given one of said plurality of pre-registered VoIP devices, at a given interval, for a mobility triggering event instigating a location update of said pre-registered VoIP device;
    a confidence determiner to determine a confidence that said mobility triggering event indicates that said VoIP device has likely moved by detecting how many of the following (1), (2), and/or (3) have changed:
        (1) an IP address associated with said pre-registered VoIP device to indicate a likely movement of said pre-registered VoIP device,
        (2) a logical location mapping of said pre-registered VoIP device to indicate a likely movement of said pre-registered VoIP device, and
        (3) a physical network resources mapping of said pre-registered VoIP device to indicate a likely movement of said pre-registered VoIP device; and
    an initiator to initiate an update of network stored geographic lat/lon location information associated with said pre-registered VoIP device in response to said mobility triggering event of said pre-registered VoIP device;
    wherein said confidence that said mobility triggering event indicates that said VoIP device has indeed moved is highest when said (1), said (2), and said (3) have changed, and lowest when only one of said (1), said (2), and said (3) have changed.

7. The mobility detection server according to claim 6, wherein:
    said indication of likely movement of said given pre-registered VoIP device is presented visually at said given pre-registered VoIP device.

8. The mobility detection server according to claim 6, further comprising:
    triggering a user prompt at said given pre-registered VoIP device to update said network stored geographic lat/lon location information associated with said given pre-registered VoIP device.

9. The mobility detection server according to claim 6, wherein:
    said given pre-registered VoIP device is a phone.

10. The mobility detection server according to claim 6, wherein:
    said monitor is adapted to compare a last IP address of said given pre-registered VoIP device stored in an appropriate VoIP IP address database to a current IP address of said given pre-registered VoIP device.

11. The mobility detection server according to claim 6, further comprising:
    a timer to indicate a time between a change in said (1), said (2), or said (3).

* * * * *